(12) United States Patent
Welch (10) Patent No.: US 6,580,552 B2
(45) Date of Patent: Jun. 17, 2003

(54) SHARED PUMP AND SERIAL RARE EARTH DOPED FIBER OPTICAL AMPLIFIERS

(75) Inventor: David F. Welch, Menlo Park, CA (US)

(73) Assignee: JDS Uniphase Corporation, San Jose, CA (US)

( * ) Notice: Subject to any disclaimer, the term of this patent is extended or adjusted under 35 U.S.C. 154(b) by 0 days.

(21) Appl. No.: 09/940,186

(22) Filed: Aug. 27, 2001

(65) Prior Publication Data

US 2003/0039027 A1 Feb. 27, 2003

(51) Int. Cl.[7] ................................................ H01S 3/00
(52) U.S. Cl. ................................... 359/341.32; 359/349
(58) Field of Search ........................... 359/341.3, 341.32, 359/134, 349

(56) References Cited

U.S. PATENT DOCUMENTS

| | | | | |
|---|---|---|---|---|
| 5,392,154 A | * | 2/1995 | Chang et al. | 359/341 |
| 5,506,723 A | * | 4/1996 | Junginger | 359/341 |
| 6,101,025 A | * | 8/2000 | Naganuma | 359/341 |
| 6,104,527 A | * | 8/2000 | Yang | 359/341 |

* cited by examiner

Primary Examiner—Mark Hellner
(74) Attorney, Agent, or Firm—Kudirka & Jobse LLP (57) ABSTRACT

An optical amplifier includes a plurality of optical paths each carrying an optical signal and each including active optical fiber. A shared pump laser is coupled to the plurality of optical paths and provides pump power to the plurality of optical paths to individually amplify the optical signals. The plurality of optical paths includes input and output optical isolators and a coupler for coupling the pump power to the optical path. The active optical fiber is doped with an implant selected from the group of rare earth metals, erbium, ytterbium, and both ytterbium and erbium. A variable attenuator can be connected between the pump laser and the coupler of at least one of the plurality of optical paths or adjacent to the output isolator of one of the optical paths. Another optical amplifier serially couples optical signals to the optical path on a common gain media.

22 Claims, 6 Drawing Sheets

SHARED PUMP AND SERIAL RARE EARTH DOPED FIBER OPTICAL AMPLIFIERS

FIELD OF THE INVENTION

The present invention relates to fiber optics, and more particularly to rare earth doped fiber optic amplifiers.

BACKGROUND OF THE INVENTION

Wavelength division multiplexing (WDM) or dense WDM (DWDM) communication systems increase the transmission capacity of an optical fiber in a communication system by combining several optical signals having different wavelengths onto the optical fiber. Generally these systems include an optical amplifier with a pump laser that provides pump power and rare earth doped optical fiber. The optical signals are coupled to the rare earth doped fiber and the pump power and rare earth doped fiber amplify the optical signals. These amplifiers may also include input and output isolators and gain flattening filters.

To render these systems practical, the optical amplifiers must meet tight gain uniformity specifications over all channel wavelengths. Optical fibers often contain 80 channels at 80 wavelengths. The intrinsic gain spectrum of a rare earth doped fiber amplifier is highly non-uniform. Therefore, there are slight variations in the amount of amplification that is provided by the optical amplifier at the different wavelengths. The gain flattening filters flatten the gain profile of the channels after amplification.

The gain profile of the fiber amplifier is complicated by other factors as well. The gain profile of a rare earth doped optical fiber amplifier (OFA), such as an erbium doped fiber amplifier (EDFA), is determined by the average inversion level of the erbium ions in the erbium doped optical fiber. This inversion level is a function of the power level of the signal or signals to be amplified and the applied power levels of the laser pump sources. If the signal power is sufficiently lower than the applied pump power, the fiber will maintain close to 100% inversion and the signal gain and the amplifier gain profile will not appreciably change with changes in input signal powers. However, as signal power increases, the signal gain in the amplifier becomes limited by the availability of pump power for the fiber amplifier. In other words, the output signal power is limited by the available pump power and the signal input power levels.

As a result of these complex design considerations, rare earth doped fiber optical amplifiers are very expensive. The design and cost of optical switch fabrics is becoming more critical to optical system architectures. As the transparency of the optical network increases, the need for switching and variable optical add/drops (VOAD) will also increase. In other words, adding and dropping individual channels will become more common. The insertion loss from the switch fabric typically varies between 5 and 15 decibels (dB). The optical amplifiers that are associated with VOAD need to compensated for this insertion loss. However, the optical amplifiers described above will be too costly to implement or duplicate for individual channels. Therefore, optical amplifiers that can amplify individual channels and that are economical to implement are needed.

SUMMARY OF THE INVENTION

An optical amplifier according to the invention includes a plurality of optical paths each carrying an optical signal and each including active optical fiber. A shared pump laser is coupled to the plurality of optical paths and provides pump power to the plurality of optical paths to individually amplify the optical signals.

In other features of the invention, the plurality of optical paths include input and output optical isolators and a coupler for coupling the pump power to the optical path. The active optical fiber is doped with an implant selected from the group of rare earth metals, erbium, ytterbium, and both ytterbium and erbium. A variable attenuator is connected between the pump laser and the coupler of at least one of the plurality of optical paths or adjacent to the output isolator of one of the optical paths.

In another aspect of the invention, an optical amplifier includes an optical path including a plurality of active optical fiber sections. A laser pump is coupled to the optical path and provides pump power on the optical path. A plurality of optical signals are serially coupled to the optical path at the active optical fiber sections, amplified, and decoupled from the optical path.

In other features of the invention, the optical paths include input and output optical isolators and a coupler for coupling the pump power to the optical path. The active optical fiber is doped with an implant selected from the group of rare earth metals, erbium, ytterbium, and both erbium and ytterbium.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
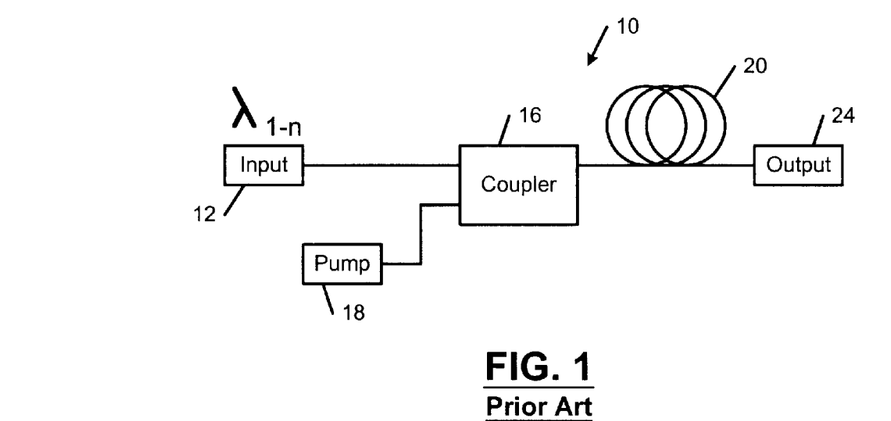
FIG. 1 illustrates an optical amplifier that amplifies optical signals in parallel according to the prior art.

Referring now to FIG. 1, an optical fiber amplifier 10 according to the prior art is shown. The optical fiber amplifier 10 amplifies multiple optical signals having different wavelengths in parallel. The optical fiber amplifier 10 includes an input connector 12, such as an APC connector, that is coupled to one end of an optical fiber 14. The optical fiber 14 can be active or passive optical fiber. As used herein, active optical fiber refers to rare earth doped optical fiber or other optical fiber that provides optical signal amplification when used with a pump laser. Passive optical fiber, on the other hand, does not provide amplification when used with a pump laser. The optical fiber 14 is connected to a coupler 16. A pump laser 18 is connected to the coupler 16. An output of the coupler 16 is connected to an active optical fiber 20 that preferably has an output connector 24, such as an APC connector. The active optical fiber 20 is preferably an optical fiber that is implanted with a rare earth dopant such as erbium (Er) or ytterbium (Yb) or co-doped with Er and Yb. The coupler 16 is preferably a WDM coupler, a fused tapered coupler or any other suitable optical coupler. The input optical signal contains multiple optical signals having different wavelengths (represented by $\lambda_{1\text{-}n}$).

Figure 2:
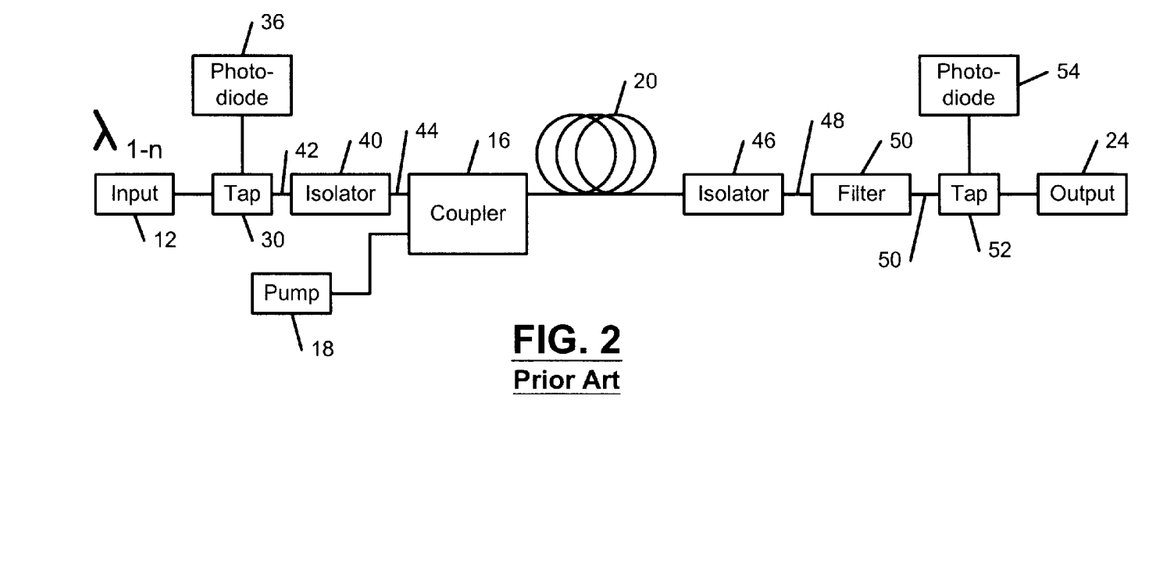
FIG. 2 illustrates the optical amplifier of FIG. 1 in further detail.

Referring now to FIG. 2, a multi-wavelength optical fiber amplifier 10' according to the prior art is shown with additional components that provide increased functionality. For purposes of clarity, reference numerals from FIG. 1 will be used where appropriate to identify similar elements. An input tap 30 is connected to the input connector 12 using a passive or active optical fiber 32. The input tap 30 is connected to a diode 36 such as a photodiode. The input tap 30 reflects a small portion of the input optical signal to the diode 36 and passes the remaining optical signal to the optical fiber 42. The input tap 30 and the diode 36 are used to quickly verify that the input optical signal exists.

An input optical isolator 40 is connected to an output of the input tap 30 by an active or passive optical fiber 42. An output of the optical isolator 40 is connected to an input of the coupler 16 by an active or passive optical fiber 44. The active optical fiber 20 is connected to an output optical isolator 46. The output optical isolator 46 is connected by an active or passive optical fiber 48 to a gain-flattening filter 50. The gain-flattening filter 50 provides compensation for the variable gain of the active optical fiber 20 as a function of wavelength, optical signal power, and pump power. An output of the gain-flattening filter 50 is connected by an active or passive optical fiber 50 to an output tap 52. The output tap 52 is connected to a diode 54 such as a photodiode and the output connector 24. The output tap 52 reflects a small portion of the output optical signal to the diode 54 to verify the existence of the output optical signal.

As can be appreciated by skilled artisans, the optical amplifiers 10 and 10' are used to amplify multiple optical signals having different wavelengths in parallel. As the number of wavelengths increases, the power of the pump laser 18 must also be increased and the increased pump laser specifications significantly increase the cost of the pump laser 18. Furthermore, the amplifiers 10 and 10' are not suitable from a cost standpoint for VOAD applications.

Figure 3:
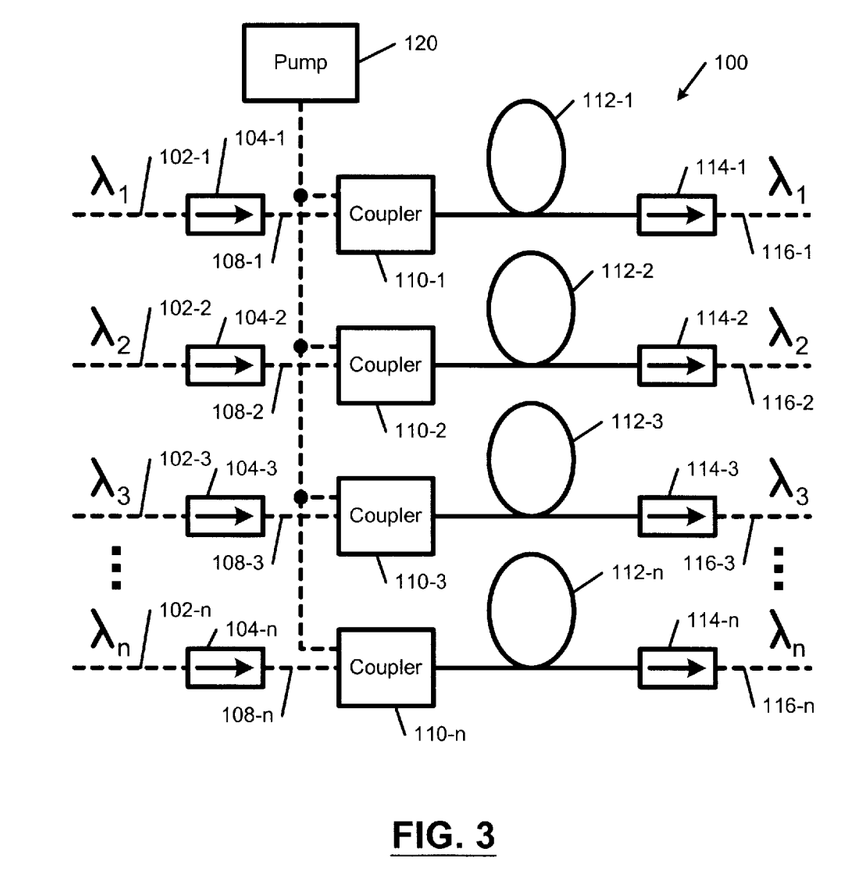
FIG. 3 illustrates a shared pump optical amplifier according to the present invention.

Referring now to FIG. 3, a shared pump optical amplifier 100 is shown. In FIGS. 3–7, solid lines indicate active optical fiber and dotted lines indicate passive optical fiber. As can be appreciated, active optical fiber can be substituted in place of passive optical fiber in FIGS. 3–7 if desired. A first optical signal having a first wavelength is carried by an active or a passive fiber 102-1 and is input to an input optical isolator 104-1. The active or passive optical fiber 102-1 is preferably attached to an input connector (not shown). An active or passive optical fiber 108-1 connects the input optical isolator 104-1 to a coupler 110-1. An active optical fiber 112-1 connects the coupler 110-1 to an output optical isolator 114-1. An active or passive optical fiber 116-1 is preferably connected to an output connector (not shown). The input and output connectors can be APC connectors.

Similarly, additional optical signals having different wavelengths are carried by active or passive optical fibers 102-, 102-3, . . . , 102-n and are input to input optical isolators 104-2, 104-3, . . . , 104-n. Active or passive optical fibers 108-2, 108-3, . . . , 108-n connect an output of the input optical isolators 104-2, 104-3, . . . , 104-n to couplers 110-2, 110-3, . . . 110-n. Active optical fibers 112-2, 112-3, . . . , 112-n connect the couplers 110-2, 110-3, . . . , 110-n to output optical isolators 114-2, 114-3, . . . 114-n. Active or passive optical fibers 116-2, 116-3, . . . , 116-n are preferably connected to output connectors (not shown).

Inputs of the couplers 110 are connected to a single pump laser 120. Advantageously, the gain specifications of the pump laser 120 are relaxed as compared with the amplifiers 10 and 10'. There is no requirement for the gain-flattening filter or multi-stage access that are generally required in parallel optical amplifiers. The output power requirements are less than 0 dB/m. Preferably, the pump laser 120 is a 980 nm pump laser.

The cost per channel is typically dictated by the amount of optical fiber. Optical fiber lengths can be made as short as 0.5 m. The absorption of Er/Yb optical fiber is 3–5 times greater than standard Er optical fiber and can be made to be even greater as the output power requirements are less than standard optical fiber. Because the required output power of the amplifier is 0 dB/m and the conversion efficiency is greater than 30%, the required input power can be as low as 3–4 mW or 1/50 of the total output power. Two pump laser modules can be used to power a full 80 channel array of optical signals.

Figure 4A:
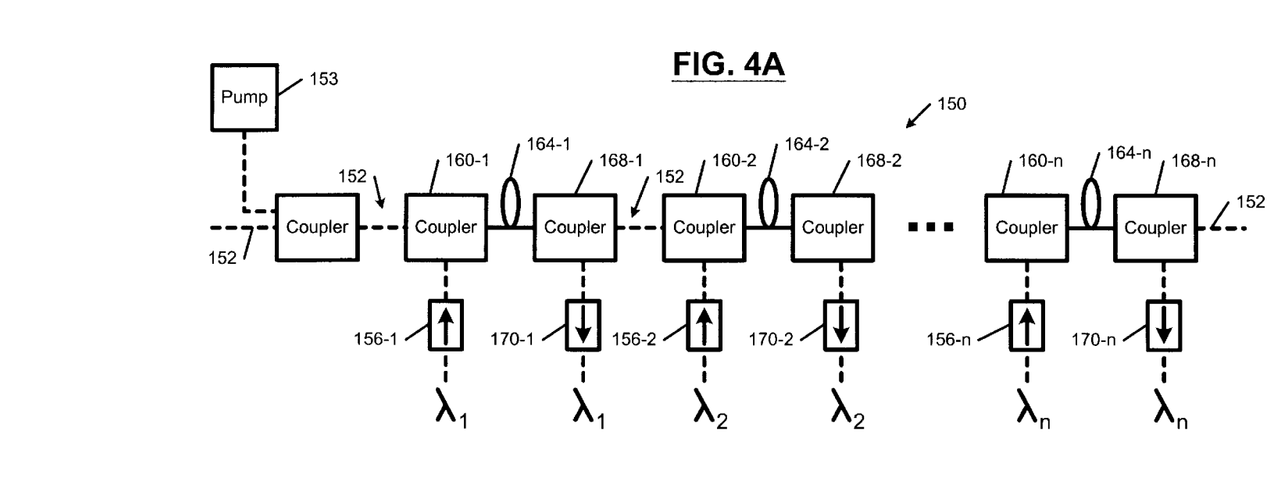
FIGS. 4A and 4B illustrate first and second alternate shared pump optical amplifiers according to the present invention that amplify optical signals in series on a common gain media.

Referring now to FIG. 4A, a shared pump optical amplifier 150 that serially amplifies individual optical signals on a single optical path is shown. A plurality of optical signals having different wavelengths are serially amplified along an optical path 152. A pump laser 153 provides pump power on the optical path 152. A first optical signal having a first wavelength is input to an optical isolator 156-1. An output of the optical isolator is connected to a first input coupler 160-1 that is also connected to the optical path 152. An active optical fiber 164-1 connects the first input coupler 160-1 to a first output coupler 168-1. The first output coupler 168-1 is connected to the optical path 152 and an output isolator 170-1. The first optical signal is coupled to the optical path 152, amplified and then de-coupled from the optical path 152.

Other optical signals having second, third, . . . , nth wavelengths are input to input optical isolators 156-2, 156-3, . . . , 156-n. An output of the input optical isolator 156 is connected to input couplers 160-2, 160-3, . . . , 160-n that are also connected to the optical path 152. Active optical fibers 164-2, 164-3, . . . , 164-n connect the input couplers 160 to output couplers 168-2, 168-3, . . . , 168-n. The output couplers 168 are connected to the optical path 152 and output isolators 170-2, 170-3, . . . 170-4. The optical signals are serially coupled to the optical path 152, amplified and then de-coupled from the optical path 152.

Figure 4B:
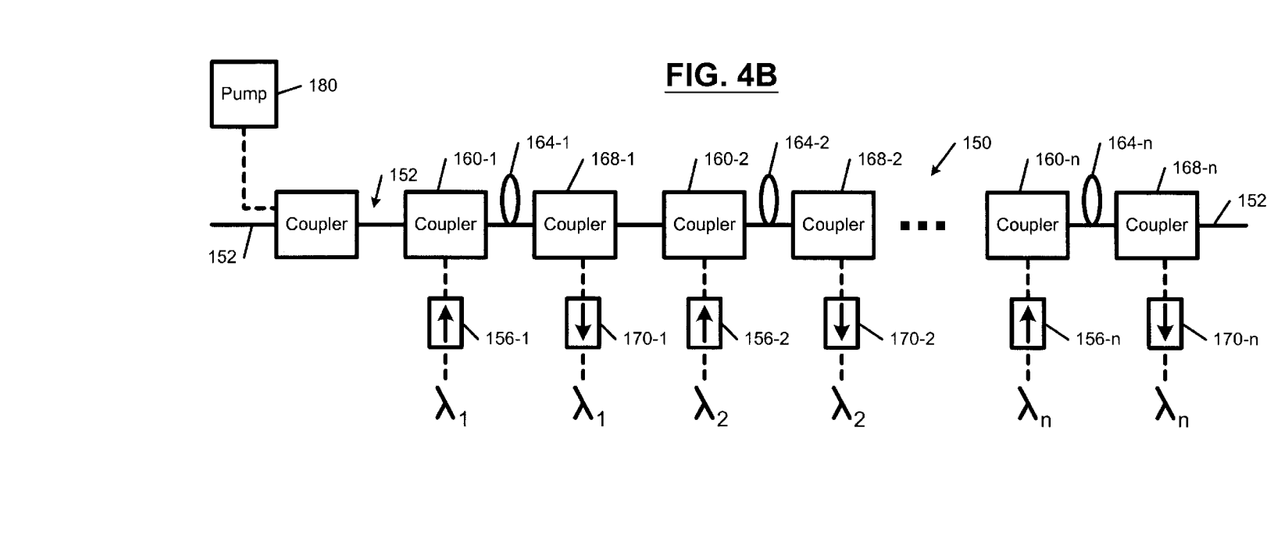

In FIG. 4A, the optical path 152 includes active and inactive optical fiber. The pump laser 153 provides pump power along the optical path 152. At a minimum, the active optical fiber is located between the input and output couplers. The remaining portions of the optical path 152 can include passive optical fiber. Alternately, the optical path 152 can include active optical fiber between adjacent pairs of couplers as is illustrated in FIG. 4B.

Figure 5:
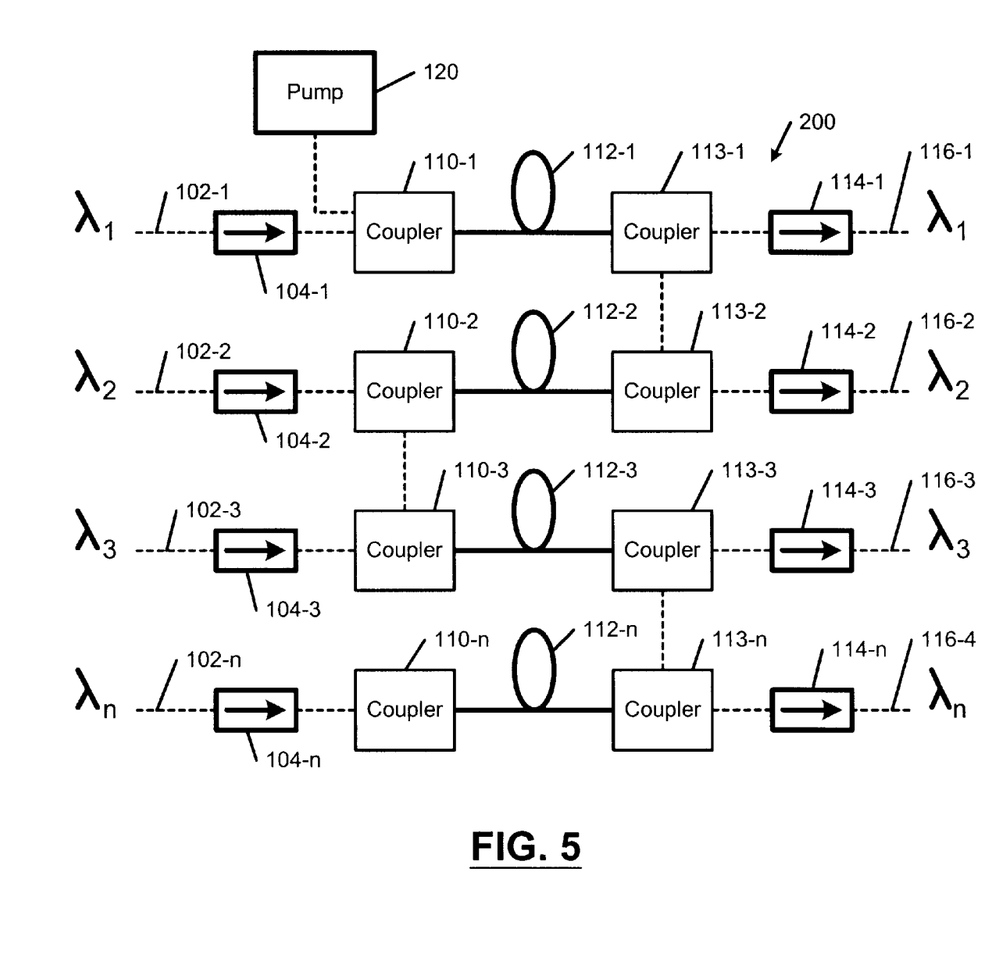
FIG. 5 illustrates a third shared pump optical amplifier.
Figure 6:
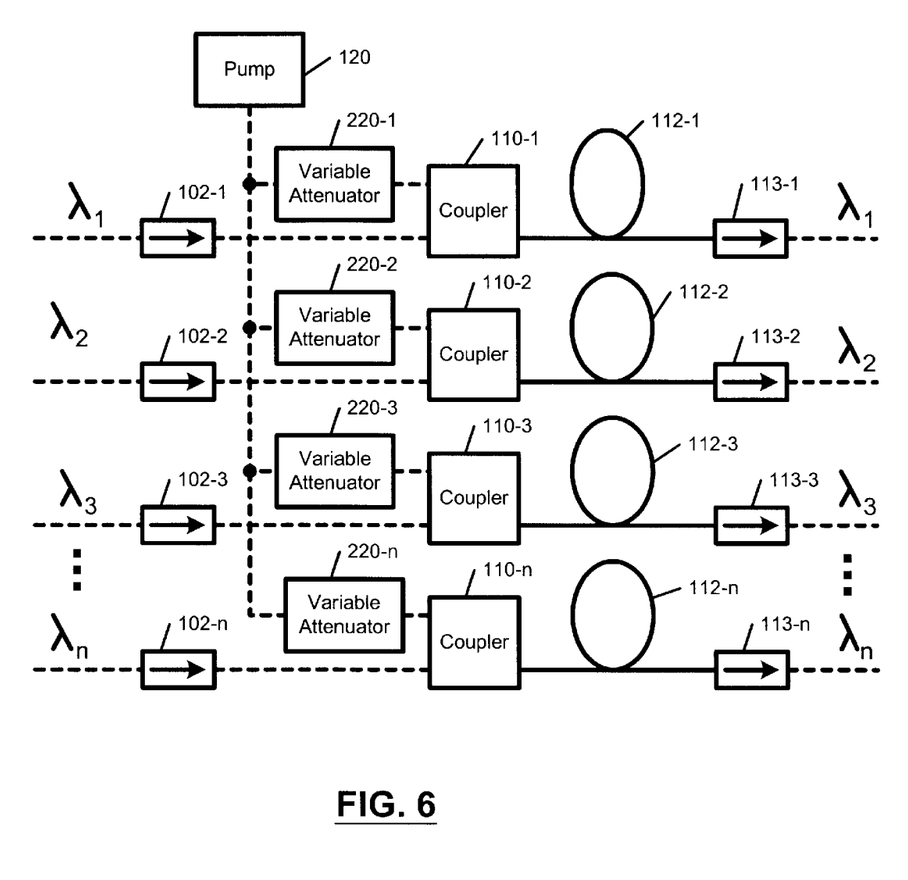
FIG. 6 illustrates the shared pump optical amplifier of FIG. 3 with a variable attenuator located between the pump laser and the coupler.

Referring now to FIG. 5, an alternate shared pump optical amplifier 200 is illustrated. For purposes of clarity, reference numbers from FIG. 3 are used to identify similar elements. A first optical signal carried by active or passive optical fiber 102-1 is input to an input optical isolator 104-1. The active or passive optical fiber 102-1 can be connected to an input connector (not shown). An active or passive optical fiber 108-1 connects an output of the input optical isolator 104-1 to an input coupler 110-1. An active optical fiber 112-1 connects the input coupler 110-1 to an output coupler 113-1. The output coupler 113-1 is connected to an optical isolator 114-1. An active or passive optical fiber 116-1 is preferably connected to an output connector (not shown).

Similarly, additional optical signals having different wavelengths are carried by active or passive optical fibers 102-2, 102-3, . . . , 102-n are input to input optical isolators 104-2, 104-3, . . . , 104-n. Active or passive optical fibers 108-2, 108-3, . . . , 108-n connect an output of the input optical isolators 104-2, 104-3, . . . , 104-n to input couplers 110-2, 110-3, . . . 110-n. Active optical fibers 112-2, 112-3, . . . , 112-n connect the input coupler 110-1 to output couplers 113-2, 113-3, . . . , 113-n. The output couplers 113 are coupled to output optical isolators 114-2, 114-3, . . . 114-n. Active or passive optical fibers 116-2, 116-3, . . . , 116-n are preferably connected to output connectors (not shown).

The output coupler 113-1 is connected to one of the input coupler 110-2 (connection not shown) or the output coupler 113-2 (connection shown). The other of the input coupler 110-2 (shown) or the output coupler 113-2 (not shown) is connected to one of the input coupler 110-3 (shown) or the output coupler 113-3 (not shown).

Figure 7:
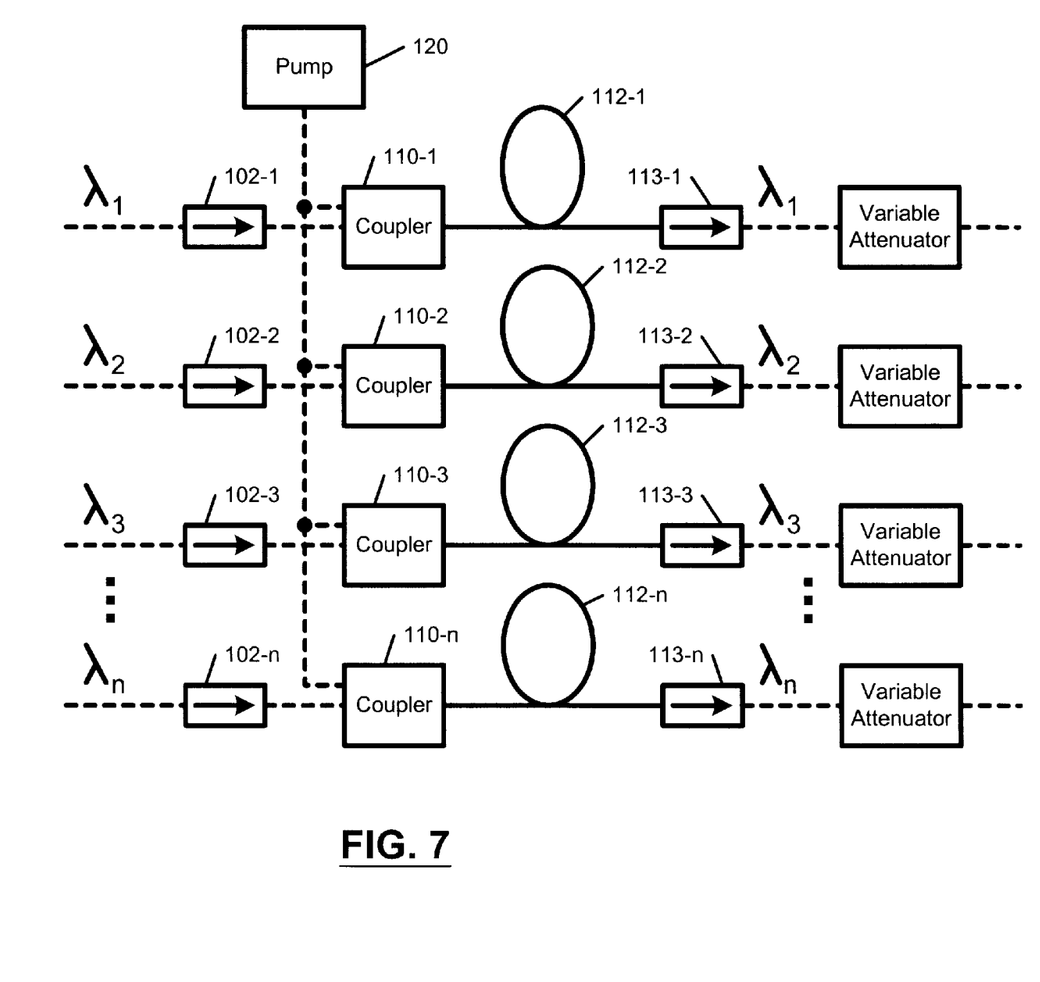
FIG. 7 illustrates the shared pump optical amplifier of FIG. 3 with a variable attenuator located between the output optical isolator and the output connector.

Variable attenuators can be added into any of the foregoing optical amplifiers. The variable attenuators can be incorporated into each channel in a traditional manner through the signal source path or incorporated into the pump laser path. For example in FIG. 6, variable attenuators 220 are added between the pump laser 120 and the couplers 110 to perform gain flattening if needed. Alternately, the variable attenuators 220 are added before or after the optical isolators as is illustrated in FIG. 7. Skilled artisans will appreciate that the variable attenuators can be positioned in other locations while providing similar functionality.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. An optical amplifier, comprising:
    a first optical path carrying a first optical signal, a first coupler and a first input optical isolator connected to said first optical path, and a first active optical fiber connected to said first coupler in said first optical path;
    a second optical path carrying a second optical signal, a second coupler and a second input optical isolator connected to said second optical path, and a second active optical fiber connected to said second coupler in said second optical path;
    a third optical path carrying a third optical signal, a third coupler and a third input optical coupler connected to said pump laser and said third optical path, and a third active optical fiber connected to said third coupler in said third optical path;
    a pump laser shared by said first, second and third optical paths and connected to said first, second and third couplers for providing pump power to amplify said first and second optical signals; and
    a variable attenuator connected between said pump -laser and at least one of said first, second and third couplers.

2. The optical amplifier of claim 1 wherein said first active optical fiber is connected to a first output optical isolator, said second active optical fiber is connected to a second output optical isolator, and said third active optical fiber is connected to an third output optical isolator.

3. A serial optical amplifier for amplifying a plurality of optical signals having different wavelengths, comprising:
    an optical path;
    a pump laser providing pump power to said optical path;
    a first coupler for connecting said pump laser to said optical path;
    a first active optical fiber connecting a first pair of couplers in said optical path, wherein one of said first pair couples a first optical signal having a first wavelength to said optical path, said first optical signal is amplified by said first active optical fiber and said pump power, and the other of said first pair decouples said first optical signal from said optical path; and
    a second active optical fiber connecting a second pair of couplers in said optical path, wherein one of said second pair couples a second optical signal to said optical path, said second optical signal is amplified by said second active optical fiber and said pump power, and the other of said second pair decouples said second optical signal from said optical path.

4. The serial optical amplifier of claim 3 further comprising:
    a third active optical fiber connecting a third pair of couplers in said optical path, wherein one of said third pair couples a third optical signal to said optical path, said third optical signal is amplified by said third optical signal, and the other of said third pair decouples said third optical signal from said optical path.

5. The serial optical amplifier of claim 4 wherein said optical path includes active and passive optical fiber.

6. The serial optical amplifier of claim 4 wherein said first and second pair of couplers are selected from the group of WDM couplers and fused tapered couplers.

7. The serial optical amplifier of claim 4 wherein said pump laser operates at 980 nm.

8. The serial optical amplifier of claim 4 wherein said first and second active optical fiber is doped with a rare earth metal.

9. The serial optical amplifier of claim 4 wherein said first and second active optical fiber is doped with an implant selected from erbium, ytterbium and both erbium and ytterbium.

10. An optical amplifier for amplifying individual wavelengths, comprising:
    a first signal path carrying a first optical signal and including a first input coupler that receives said first optical signal, a first output coupler, and a first active optical fiber connecting said first input coupler to said first output coupler;
    a second signal path carrying a second optical signal and including a second input coupler receiving said second optical signal, a second output coupler and a second active optical fiber connecting said second input coupler to said second output coupler;

a third signal path carrying a third optical signal and including a third input coupler receiving said third optical signal, a third output coupler, and a third active optical fiber connecting said third input coupler to said third output coupler; and a pump laser connected to said first input coupler, wherein said first output coupler is connected to one of said second input coupler and said second output coupler.

11. The optical amplifier of claim 10 wherein said pump laser operates at 980 nm.

12. The optical amplifier of claim 10 wherein said first and second active optical fibers are doped with a rare earth metal.

13. The optical amplifier of claim 10 wherein said first and second active optical fibers are doped with an implant selected from erbium, ytterbium and both erbium and ytterbium.

14. The optical fiber of claim 10 wherein one of said second input coupler and said second output coupler is connected to one of said third input coupler and said third output coupler.

15. An optical amplifier comprising:

a plurality of optical paths each carrying an optical signal and each including active optical fiber, input and output optical isolators and a coupler for coupling said pump power to said optical path;

a shared pump laser that is coupled to said plurality of optical paths and that provides pump power to said plurality of optical paths to individually amplify said optical signals; and a variable attenuator connected between said pump laser and said coupler of at least one of said plurality of optical paths.

16. An optical amplifier comprising:

a plurality of optical paths each carrying an optical signal and each including active optical fiber and input and output optical isolators;

a shared pump laser that is coupled to said plurality of optical paths and that provides pump power to said plurality of optical paths to individually amplify said optical signals; and a variable attenuator connected adjacent to said output isolator of one of said optical paths.

17. An optical amplifier comprising:

an optical path including a plurality of active optical fiber sections;

a laser pump that is coupled to said optical path and that provides pump power on said optical path; and a plurality of optical signals that are serially coupled to said optical path at said active optical fiber sections, amplified, and decoupled from said optical path.

18. The optical amplifier of claim 17 wherein said optical paths include input and output optical isolators.

19. The optical amplifier of claim 18 wherein said optical paths include a coupler for coupling said pump power to said optical path.

20. The optical amplifier of claim 19 wherein said coupler is selected from the group of WDM couplers and fused tapered couplers.

21. The optical amplifier of claim 17 wherein said pump laser operates at 980 nm.

22. The optical amplifier of claim 17 wherein said active optical fiber is doped with an implant selected from the group of rare earth metals, erbium, ytterbium, and both erbium and ytterbium.

* * * * *